(12) United States Patent
Gordon et al.

(10) Patent No.: US 10,380,805 B2
(45) Date of Patent: *Aug. 13, 2019

(54) FINDING AND DEPICTING INDIVIDUALS ON A PORTABLE DEVICE DISPLAY

(71) Applicant: International Business Machines Corporation, Armonk, NY (US)

(72) Inventors: Michael B Gordon, Yorktown Heights, NY (US); James R Kozloski, New Fairfield, CT (US); Jonathan Lenchner, North Salem, NY (US); Clifford A Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,468

(22) Filed: Dec. 22, 2018

(65) Prior Publication Data

US 2019/0180510 A1 Jun. 13, 2019

Related U.S. Application Data

(63) Continuation of application No. 15/836,882, filed on Dec. 10, 2017.

(51) Int. Cl.
*G06T 7/70* (2017.01)
*G06T 19/00* (2011.01)
(Continued)

(52) U.S. Cl.
CPC ........ *G06T 19/006* (2013.01); *G06F 3/04817* (2013.01); *G06F 3/04847* (2013.01);
(Continued)

(58) Field of Classification Search
None
See application file for complete search history.

(56) References Cited

U.S. PATENT DOCUMENTS 7,101,284 B2 9/2006 Kake
8,600,408 B2 12/2013 Brown
(Continued)

FOREIGN PATENT DOCUMENTS

WO 2006067826 A1 6/2006
WO 2007042251 A2 4/2007

*Primary Examiner* — Jeffrey J Chow
(74) *Attorney, Agent, or Firm* — Jeffrey S LaBaw; Feb R Cabrasawan

(57) ABSTRACT

Presenting locations of individuals on a display of a portable device is described. A region of interest is determined by a location and an orientation of the portable device. The region of interest is a cone of interest radiating away from the location of the portable device in a direction of orientation of the portable device. A set of locations of one or more individuals of interest is determined with respect to the cone of interest. An orienting background and a first set of representations against the orienting background is presented on the display according to the location and orientation of the display. Each representation is of a respective individual of interest located in the cone of interest. The orienting background contains a positional cue of a landmark which the portable device is oriented toward. The cone of interest is adjusted with a pinch gesture on the orienting background. A set of locations of one or more individuals of interest is determined with respect to the adjusted cone of interest. A second set of representations is presented against the orienting background.

20 Claims, 12 Drawing Sheets

(51) Int. Cl.
  *G06F 3/0481* (2013.01)
  *G06F 3/0484* (2013.01)
  *G06F 3/0488* (2013.01)

(52) U.S. Cl.
  CPC ............ *G06F 3/04883* (2013.01); *G06T 7/70* (2017.01); *G06F 2203/04808* (2013.01); *G06T 2200/24* (2013.01); *G06T 2207/20104* (2013.01)

(56) References Cited

U.S. PATENT DOCUMENTS

| | | |
|---|---|---|
| 8,879,155 B1 | 11/2014 | Teller |
| 9,052,199 B2 | 6/2015 | Gordon |
| 9,363,734 B2 | 6/2016 | Rajeevalochana |
| 9,599,821 B2 | 3/2017 | Van Curen |
| 9,720,238 B2 | 8/2017 | Munger |
| 2007/0117576 A1 | 5/2007 | Huston |
| 2007/0268392 A1 | 11/2007 | Paalasmaa |
| 2008/0147730 A1 | 6/2008 | Lee |
| 2011/0071757 A1 | 3/2011 | Lee |
| 2011/0193985 A1 | 8/2011 | Inoue |
| 2011/0279446 A1 | 11/2011 | Castro |
| 2013/0111366 A1 | 5/2013 | Silbey |
| 2013/0254312 A1 | 9/2013 | Maheshwari |
| 2014/0043443 A1 | 2/2014 | Sharma |
| 2014/0063058 A1 | 3/2014 | Fialho |
| 2014/0152534 A1 | 6/2014 | Djabarov |
| 2014/0320668 A1 | 10/2014 | Kalevo |
| 2014/0323162 A1 | 10/2014 | Ezra |
| 2015/0063610 A1 | 3/2015 | Mossner |
| 2016/0119751 A1 | 4/2016 | Park |
| 2016/0225137 A1 | 8/2016 | Horovitz |
| 2017/0180959 A1 | 6/2017 | Kim |
| 2018/0286075 A1 | 10/2018 | Jones |

FINDING AND DEPICTING INDIVIDUALS ON A PORTABLE DEVICE DISPLAY

BACKGROUND OF THE INVENTION

This disclosure relates generally graphical user interfaces. More particularly, it relates to a graphical user interface for finding and depicting individuals.

Computer users are increasingly interconnected by the Internet and social networking applications with other users that share their interests and attributes. Portable devices are useful for allowing users to remain in contact with other users outside their home or work environments. While travelling, some users would like to know when family, friends, co-workers or other people, e.g., people in one of their social networks, are near their current location.

Some applications or "apps" have been developed to fulfill this need. Typically, software applications display digital maps that are resident on smartphone and tablets computers, for example. In addition to displaying the map data, the user's current position and the individuals of interest are displayed. To date, however, the interfaces have portrayed the user and the individuals of interest as "dots on a map". Unfortunately, this is a non-intuitive way to locate other users, particularly if the user is unfamiliar with the area in which the user is travelling.

Further improvements in graphical interfaces are needed.

BRIEF SUMMARY

According to this disclosure, a method, apparatus and computer program for presenting locations of individuals on a display of a portable device are described. A region of interest is determined by a location and an orientation of the portable device. The region of interest is a cone of interest radiating away from the location of the portable device in a direction of orientation of the portable device. A set of locations of one or more individuals of interest is determined with respect to the cone of interest. An orienting background and a first set of representations against the orienting background is presented on the display according to the location and orientation of the display. Each representation is of a respective individual of interest located in the cone of interest. The orienting background contains a positional cue of a landmark which the portable device is oriented toward. The cone of interest is adjusted with a pinch gesture on the orienting background. A set of locations of one or more individuals of interest is determined with respect to the adjusted cone of interest. A second set of representations is presented against the orienting background.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, the invention is a method, system and computer product for providing a graphical user interface comprising for displaying information about the location of one or more individuals. Embodiments of the invention include methods for monitoring the location and orientation of the display and the location and facing direction of the user with respect to the display and the environment. The direction that the user is currently facing when using the device determines what an appropriate display of the one or more individuals should be in the interface. For example, if the user is facing the display and the individuals are located in a "cone of interest" located in front of the user, the graphical user interface displays the individuals in an identifiable manner, e.g., as pictures, in a background representing the environment in the cone of interest. That is, rather than displaying the locations of the individuals as mere points on a map, the interface presents a more intuitive interface that allows the user to locate and orient toward the individuals and the world, and then based on the location and orientation information, if desired, meet the individuals of interest.

The inventive interface is superior to a "dots on a map" interface where the dots represent the user and the people being sought. Maps are not intuitive. In some environments such as a crowded beach or park, at an outdoor rock concert, in a crowded mall, maps are useless. Further, prior art maps are generally two-dimensional; in embodiments of this invention, the interface allows the user to locate and identify people in the third dimension, e.g., for example, on a floor of a nearby building.

Embodiments of the invention display a graphical user interface representing the location of one or more individuals of interest on the background of an orienting background. By monitoring the location and orientation of the display and the location of the individuals of interest with respect to the device, the interface determines what an appropriate display of the one or more individuals should be. For example, if the user is facing the display and the individuals are located in a "cone of interest" or "region of interest" located in front of the user, the graphical user interface displays the individuals in an identifiable manner, e.g., as pictures, in a background depicting the environment in the cone of sight. That is, rather than displaying the locations of the individuals as mere points on a map, the interface presents a more intuitive interface that allows the user to locate and orient toward the individuals and the world, and then based on the location and orientation information, if desired, meet the desired individual. As described below, the "cone of interest" is configurable by the user in an intuitive manner.

Figure 1:
FIG. 1 depicts an exemplary interface for an embodiment of the present invention in which a single individual of interest is shown against an orienting background.

FIG. 1 depicts an exemplary interface for an embodiment of the present invention in which a single individual of interest is shown against an orienting background. The user holds a portable device 31, e.g., a tablet, in front of the user. In the interface an orientating background 32 is shown. Over the background, in preferred embodiments, at least one member of a group of individuals of interest is depicted as a recognizable representation 33. The individual is shown in the interface as a picture 33 since the individual is in the cone of interest in the direction that the user and portable device are facing. Embodiments of the invention are displayed by any of a tablet computer, a smartphone, augmented reality glasses, smart watch or other portable device.

The orienting background 32 is illustrated in different manners in respective embodiments of the invention. In embodiments of the invention, the background 32 is orientation-sensitive, having cues in the background to orient the user to the environment by displaying a background representative of the environment with positional cues. That is, the background in the interface helps the user orient to the environment in which the user is presently located. The positional cues in alternative embodiments include one or more of a camera view of the environment, a stylized version of the environment and/or landmarks in a horizontal view. In alternative embodiments of the invention, the user interface is "immersive", e.g., using virtual reality, and therefore the orienting background is also virtual reality. The orienting background in some embodiments of the invention is user selectable, e.g., the user can select between a camera view and a representational view. A representation view is one in which the landmarks are represented as drawings or caricatures. Temporary landmarks (such as the moon) may also be included in the background to provide orientation cues for the user. In yet other embodiments, the orientation-sensitive landscape background is embedded with labelled information about the landmarks. By placing pictures or other representations of the individuals, e.g., representation 33, in a "see through", orienting display, the positional cues orient the user, enabling the user to locate the individuals of interest.

The individual of interest is depicted as a representation 33. Embodiments of the invention use one or more filters for selecting the individuals of interest that the user is interested in seeing on the interface. That is, the user can select one or more individuals, members of a social network, members of a cohort such as employees of a company, family members, friends, only people currently looking for the user, and other user configurable groups of individuals. In embodiments of the invention, only the individuals who pass through the selected person filter are depicted in the interface. In addition to the person filter for the set of individuals of interest, a geographic filter is used in embodiments of the invention, either in conjunction with the person filter defining a set of individuals or by itself. By manipulating a "region of interest," the user may, for example, filter out individuals beyond a threshold distance. The filter may also be a time filter, e.g., for a given person or group of people that the user is looking for during a particular window of time. That is, the filter can be time configurable as well. The interface displays the individuals of interest as if the user is facing the individuals nearby, when the device is oriented toward the individuals, although the user is actually far in distance from the individuals of interest.

The representation 33 of a respective individual of interest can be a photograph of the individual. Alternatively, the representation 33 can be a caricature, a cartoon or an icon that the user has selected to represent the particular user. Further, the presence of one or more of the individuals of interest may be annotated with labelled information in preferred embodiments of the invention, either in a default or pop-up display format. Yet further, a respective individual of interest can be represented by a selected representation of a set of representations based on the distance or activity of the individual. For example, a moving individual can be represented by the icon selected for the individual plus an icon representing the mode of movement, e.g., walking, car, airplane. Distance can be represented by the selected icon and a distance numeral in the corner of the icon, or by a smaller or larger version of the selected icon at given distances.

Figure 2:
FIG. 2 shows an exemplary interface for an embodiment of the present invention in which two individuals of interest are shown against an orienting background.

FIG. 2 shows an exemplary interface for an embodiment of the present invention in which two individuals of interest are shown against an orienting background 32. In this drawing as compared to FIG. 1, a second representation 34 of a second individual of interest is shown in the interface in addition to the first representation 33 of the first individual. The appearance of the second representation 34 can be due to several factors as will be discussed below. First, the second individual may have moved into the "zone of interest", i.e. the geographic filter, defined by the user. Second, the user may have adjusted the zone of interest to be slightly larger, e.g., either subtending a larger arc in a "cone of interest" or extending to a greater distance from the user, like zooming out in a telephoto lens. Third, the user may have changed the definition of the set of individuals of interest, e.g., the person filter, to include more individuals, in this case, the second individual. Fourth, the second individual may have changed their privacy settings, allowing the interface to portray their representation 34.

In operation, the user can pan the portable device looking for the individuals of interest. As the user pans, the orienting background changes to reflect the environment which the user now faces like a camera in real-time. Individuals of interest appear and disappear over the background 32 as the user faces the general direction of respective individuals of interest. For example, Mike (the user) is looking for James (his friend) using an implementation of the invention on his smartphone. As Mike turns and points his phone in a particular direction, i.e. the direction in which James is located, a picture of James appears in the interface, almost as if Mike is looking directly at James. When Mike turns further, the image of James disappears since his smartphone is no longer oriented in the direction of James. Alternatively, if Mike holds the smartphone still and James is walking, James will eventually disappear from the interface.

Figure 3:
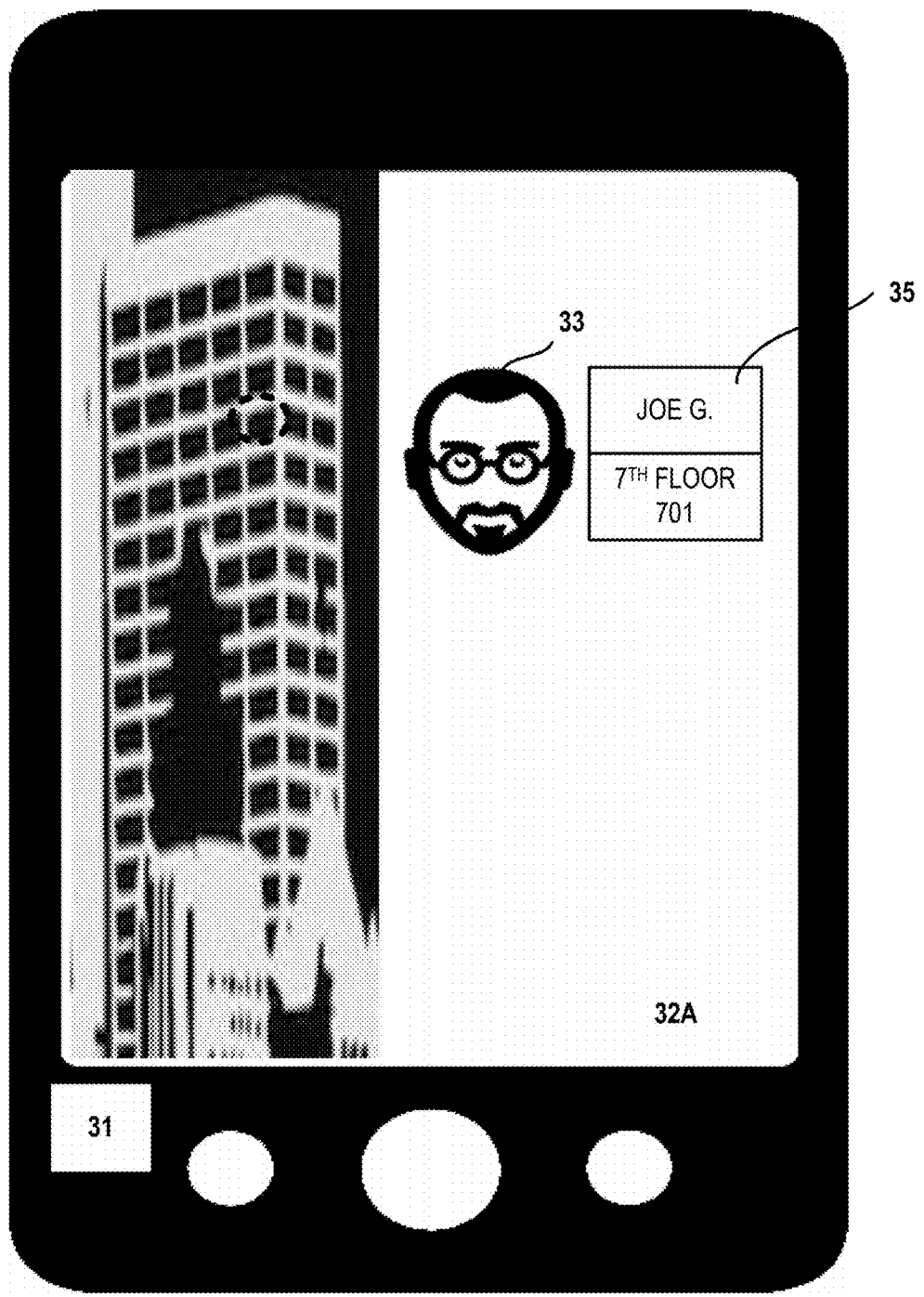
FIG. 3 depicts an exemplary interface for an embodiment of the present invention in which an individual of interest is shown as a portable device is raised.

Embodiments of the invention operate intuitively in a three-dimensional environment. The interface of the present invention is adaptable to "3-D" environments, e.g., buildings, or space stations, which are not as well represented by map point interfaces. FIG. 3 depicts an exemplary interface for an embodiment of the present invention in which an individual of interest is shown when a portable device is raised from the horizon by the user. In this example, the user knows that his business contact is located in a nearby specific building, but not the office or floor. The user points his device at the building and once the device is pointing up, e.g., to the correct floor, the representation 33 of the individual of interest is shown in the interface. The orienting background 32A in the interface depicts the building and nearby buildings. Also shown is annotation 35 which contains information about the individual of interest, e.g., name and location and the location of the individual shown as a dashed circle. The interface can use input from an accelerometer or gyroscope to get an angle of inclination, which is used to determine when the device is pointed to the floor the individual of interest is on. In reality, the field of view encompasses several floors as indicated by the orientation background 32A. The required amount of vertical movement of the device to invoke the vertical information is exaggerated in some embodiments of the invention to help the user control when the mode is invoked. For example, the interface may require more angle on the phone than actually needed, particularly at a large distance, to invoke the three dimensional aspect of the interface.

The name, location and other information in the annotation 35 can come from a plurality of sources. Some information can be held at the user device, for example, the name of the individual of interest can be input as part of the user configuration of the interface. Some information may be from the device of the target individual of interest, e.g., his current location, or a targeted message to the user. Some information might be from a third party. For example, if both the user and the individual of interest were employed by the same organization and the organization tracked the employees, e.g., using badges and indoor beaconing, the location information may be from the corporate intranet.

Figure 4:
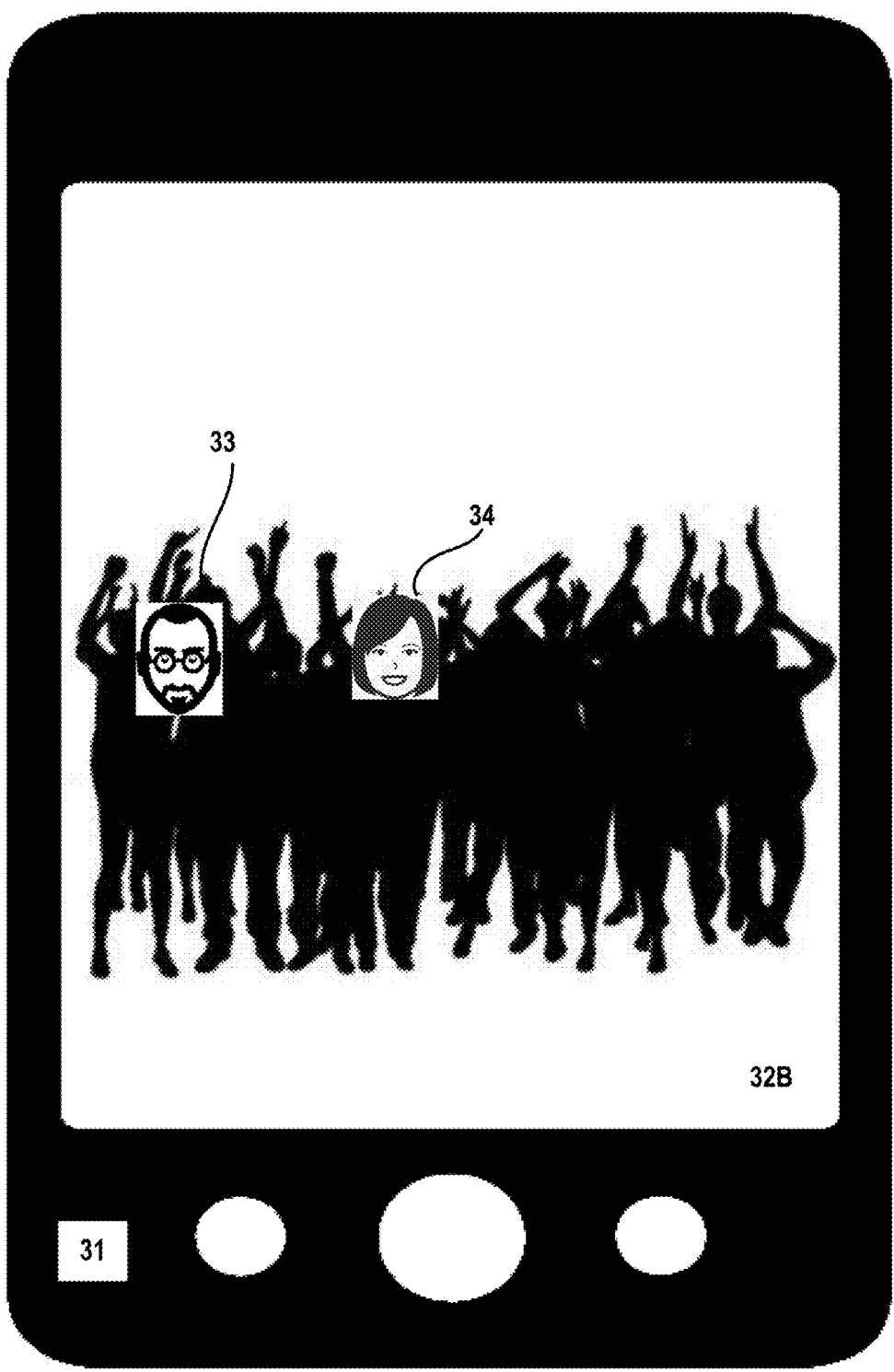
FIG. 4 is an exemplary interface for an embodiment of the present invention in which individuals of interest are shown in a crowd.

FIG. 4 is an exemplary interface for an embodiment of the present invention in which individuals of interest are shown in a crowd. Embodiments of the invention present the individuals of interest in intuitive ways when the individuals are in crowds, e.g., at events in buildings, parks, malls, beaches and so forth. As shown in FIG. 4, the display depicts the interface when a user is hunting for a set of individuals of interest in a crowd. In this embodiment, a user scans a crowd using the interface on a portable device to help identify and locate friends/family/colleagues, located somewhere in the crowd. Images 33 and 34 of individuals of interest are displayed over the orienting background 32B of the crowd. The background in this case is a feed of the camera on the smartphone. Thus, the interface is useful to find when friends, family or people within the user's social network are within or near a current location. For example, a user can find a friend by pointing the screen at a landing airplane or arriving bus. The interface is useful even if the user does not know that the individuals of interest were coming to or near the user's current location. Embodiments of the invention can be used to locate individuals who are unknown to the user, e.g., a "blind date" or a new business contact, in a crowded environment like a concert or restaurant. A privacy option such as opting-in for a limited period of time can be placed in effect, so as not to reduce privacy.

In embodiments of the invention, the user may request to be shown a direction in which a density of people where the user knows is high, e.g., a higher density relative to other directions, or higher than a threshold. This could be useful in a crowded environment to "show me where my friends are."

Figure 5:
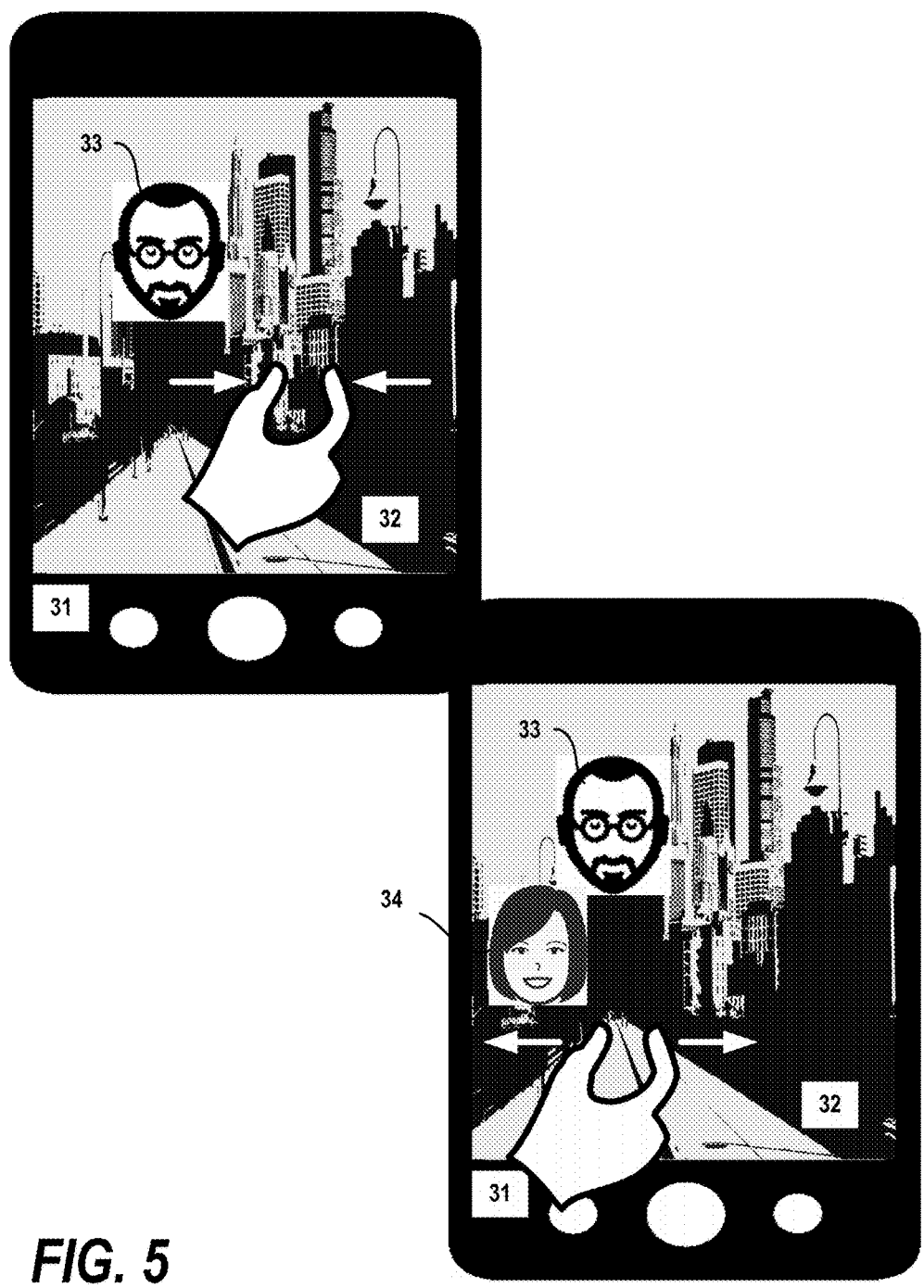
FIG. 5 illustrates pinch gestures being performed in an interface designed according to an embodiment of the invention.

FIG. 5 illustrates pinch gestures being performed in an interface designed according to an embodiment of the invention. In the top window, the user performs a "pinch in" gesture over the background 32. Unlike a conventional user interface in which a pinch in gesture is used to resize the image, in embodiments of the invention, the pinch in gesture is used to decrease the size of the cone of interest. In embodiments of the invention, the display of the orienting background 32 itself is unchanged. As shown in FIG. 5, the pinch in gesture is horizontal, narrowing the arc of the cone of interest and only a single representation 33 of an individual of interest is shown over the background 32.

In other embodiments of the invention, a pinch in gesture focuses the cone of interest, on a selected individual of interest, thereby moving the apex of the cone of interest away from the user and changing the orienting display 32 to focus on landmarks closer to the selected individual.

A vertical pinch in gesture can be used to decrease the maximum distance (e.g., the range) of the cone of interest.

In the bottom window, a "pinch out" gesture is performed. In preferred embodiments of the invention, a pinch out gesture performed on the background 32 increases the size of the cone of interest. Here, the pinch out gesture is horizontal, increasing the arc of the cone of interest. Note because the size of the cone of interest is increased, a second representation 34 is shown in the interface, corresponding to another individual of interest who was located in the increased area. Though the pinch out gesture was performed on the background, the image of the background is left unchanged. A vertical pinch out gesture can be used to increase the maximum distance (e.g., the range) of the cone of interest. In other embodiments of the invention, the pinch out gesture can be used to adjust the apex of the cone of interest closer to the user, e.g., back to the location of the user device.

In yet other embodiments of the invention, the pinch in gesture and pinch out gesture are used to control the size and apex of the cone of interest in a single gesture.

In embodiments of the invention, an interface window detailing the number of degrees in the arc or the maximum distance (e.g., range) of the current cone of interest is shown so that the user can adjust the cone of interest with successive pinch in and pinch out gestures. In embodiments of the invention, the horizontal and the vertical components of the pinch gesture are used to change the arc and maximum distance (e.g., range) of the cone of interest, respectively.

Figure 6:
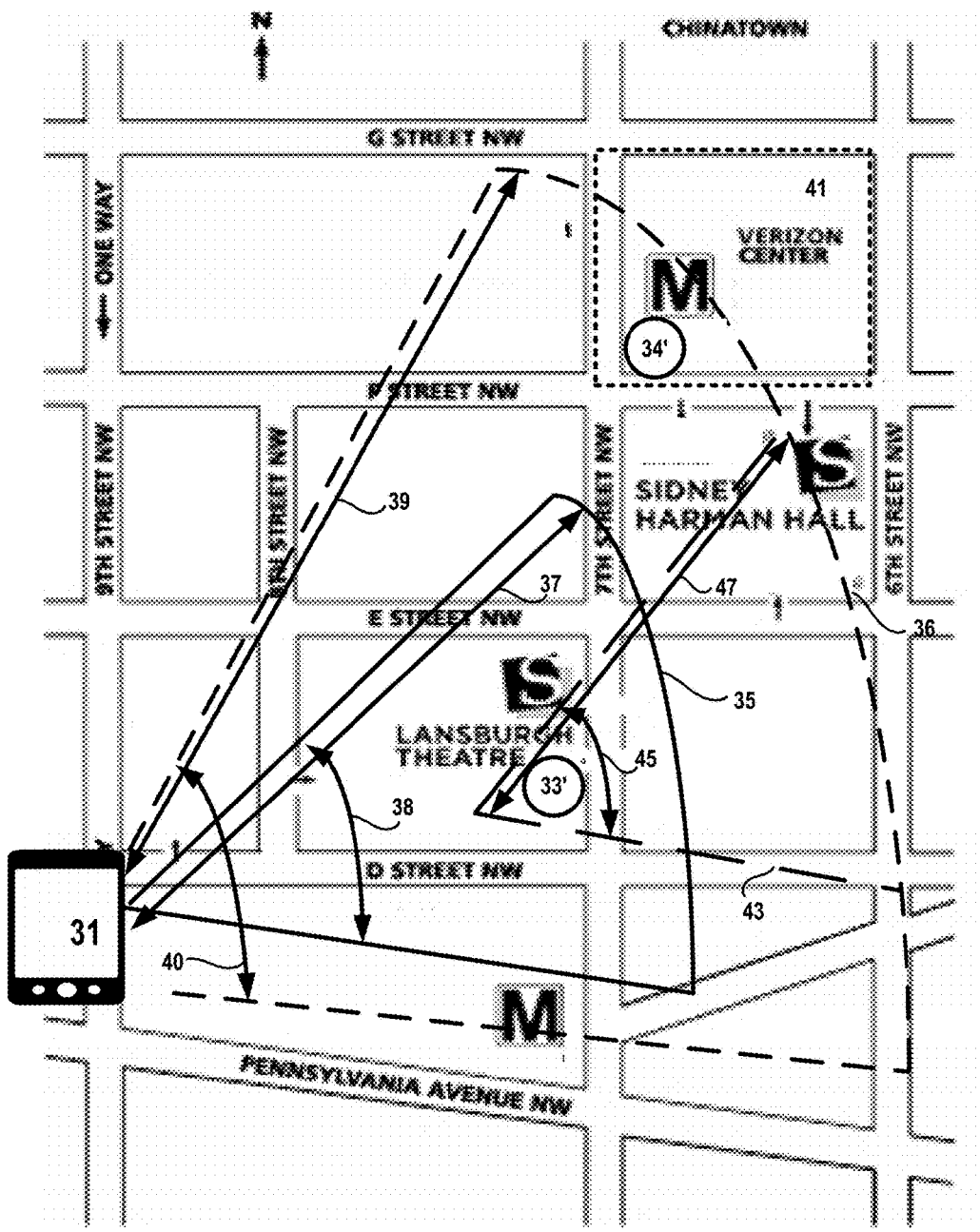
FIG. 6 is a diagram of several "cones of interest" and a region of interest defined in the interface by a user according to embodiments of the invention.

FIG. 6 is a diagram of several "cones of interest" and a region of interest defined in the interface by a user according to an embodiment of the invention. A cone of interest is a specific shape of a region of interest used in embodiments of the invention. The position of the user and the portable device 31 is shown on the map. The positions of the first individual of interest 33' and the second individual of interest 34' are also shown. The first cone of interest 35 defines a zone of interest corresponding to the top window in FIG. 5. Only the first individual of interest 33' is in the first cone of interest 35. The second cone of interest 36 defines a zone of interest corresponding to the bottom window in FIG. 5. The first cone of interest 35 is defined by a maximum distance (e.g., range) 37 and an arc 38 which defines an angle. The second cone of interest 36 is defined by maximum distance (e.g., range) 39 and arc 40, as the user has performed a pinch out gesture in both the horizontal and vertical directions from the first cone of interest which increases the arc and maximum distance, respectively.

The drawing also shows a region of interest 41 which can also be defined by the user. In embodiments of the invention, the user can switch between a map interface and the intuitive interface. In the map interface, the user can define a region of interest by touching the corners of a region of interest. The corners of the region of interest can be adjusted by a touch and drag operation. Alternatively, the user can define a region of interest by a text input or speech input. In the illustrated embodiment the city blocks surrounding the Verizon Center is the region of interest 41. Thus, either a text input or speech input can be used to designate the Verizon Center as the region of interest.

Further, the region of interest can be the intersection of a region of interest and a cone of interest. This feature is useful when the user is close to a large region of interest and wishes to use the pan feature of the interface, but does not want to see an individual of interest outside the region of interest. As shown in the drawing, the southwest quadrant of the Verizon Center is both in the region of interest 41 and the second cone of interest 36. Thus, in this embodiment, as individual 34' is in both the region of interest and cone of interest, a representation of the individual would be shown in the interface.

As described above, in alternative embodiments, a pinch in or pinch out gesture adjusts the position of the apex of the cone of interest. In a default mode, the cone of interest is oriented so that the apex of the cone is collocated with the user and radiates away from the apex, e.g., cone of interest 36. In the second embodiment, a pinch in gesture will move the apex of the cone forward, e.g., cone of interest 43. The axis along which the cone of interest can be moved is either the midsection of the original cone of interest, or in the direction of a selected individual of interest, e.g., individual 33'. In some embodiments of the invention, the arc 45 subtends the same number of degrees as the arc 40 of the original cone of interest 36. The maximum distance 47 from the apex has changed from distance 39, although in this example, the maximum distance from the user is unchanged. Selecting the individual of interest can be accomplished by touching a representation of the individual in embodiments of the invention and then performing the pinch in gesture. The cone 43 is still considered to radiate away from the user device as it becomes wider as the distance increases from the device. To return to the original cone of interest, e.g., cone 36, a pinch out gesture can be performed.

Figure 7:
FIG. 7 shows an interface according to an embodiment of the invention in which a user movement state is depicted.

FIG. 7 shows an interface according to an embodiment of the invention in which a user movement state is depicted. The interface is similar to that in FIG. 2, however, the representation 33 of one of the individuals of interest is presented in a way that shows movement, in this case, the user is walking. Other movement representations such as a car, train or plane are used in embodiments of the invention. The interface knows that the individual of interest is moving from location information such as GPS information from the individual's device. Alternatively, network information, e.g., from a General Motors OnStar network or an airline network can be used to infer the user movement. The user representation is a vector in some embodiments, e.g., presenting different pictures at different distances from the user. Preferably, the selection of the picture is a user setting so that the user knows the meaning of the different representations. As mentioned above, in embodiments of the invention, the orienting background 32 includes temporary landmark representations such as the crescent moon representation 55 shown in the drawing in embodiment where a representational orientating background is provided, rather than the camera view. Temporary landmarks such as the sun or the moon can be the most visible features by which the user can oriented himself with the environment.

Figure 8:
FIG. 8 shows an interface according to an embodiment of the invention in which guide arrows are shown.

FIG. 8 shows an interface according to an embodiment of the invention in which guide arrows are shown. The user may search for one or more particular individuals of interest. In this embodiment, the user selects a representation(s) of the set of individuals which is the subject of the search. In this case, the user has selected the individuals indicated by representations 33 and 34. In the interface, left arrow 57 or right arrow 59 will be displayed, indicating the direction that the user should pan between left arrow 57 and right arrow 59 to locate the individual. In alternative embodiments, the arrows are displayed proximate to the representation, e.g. inside the window which displays the representation. This implementation is useful when multiple individuals of interest are selected who are potentially located in different venues. When a three dimensional interface is used, up arrow 61 or down arrow 63 is also displayed. Although all four arrows are displayed for ease in illustration, when in use, only one arrow is typically displayed, unless multiple individuals at different locations are designated. Once the individual of interest is located, i.e. by moving the portable device in the correct direction, in preferred embodiments of the invention, a visual or audio cue alerts the user and the arrow is removed from the interface.

Although the description of the interface is focused on a preferred embodiment, it can be used in any type of locating application, where an orienting background is presented with representations of the desired individual, animals or objects.

Embodiments of the invention may be used for many purposes. Currently, when people are using computers and smartphones, they can generally see when people within their social networks are also connected on-line. Among the possible applications of this invention include emergency responder and police applications. In such applications, the emergency responders generally do not know the identity of the individuals of interest, e.g., people trapped in a fire, perpetrator in a bank heist, so that a representation of a generic human figure might be displayed as the representation of these individuals. In embodiments of the invention, the emergency responders would get more details about those individuals who opt-in than those who have not opted in. The information presented could be dependent on local laws. That is, where privacy laws prevent the dissemination of personally identifiable information without the individual's consent, less information would be typically displayed.

The device which the individual of interest is using may be different than the portable computing device which the emergency responder is using. For example, for the elderly or disabled, it is common to have a medical alert device. In embodiments of the invention, the medical alert device could be augmented to provide information for the use by emergency responders, e.g., through a dialog box next to a generic figure or representation of the patient.

In other embodiments of the invention, the interface may be virtual, e.g., for use in a 3D game or virtual world. For example, an avatar may hold a virtual smartphone in a virtual world as the avatar/user moves around the world. Users (in the form of avatars) may look for people represented as avatars in a virtual world or a 3D game. In one example, this invention could be applied to games such as "hide and seek" where the user could (for example) obtain a brief glimpse of individuals hidden behind walls or in closets (or otherwise out of plain sight). The user can define regions of interest in a virtual world, rather than use the cone of interest in the virtual world.

Embodiments of the invention are useful in a business context. The user may specify regions of interest such as conference centers, trade shows and company buildings. In another example, a user might look for a business associate who is heading for the same conference room for a meeting. By pointing the display around, the user could observe whether the associate is already seated in the room, or is heading towards the conference room.

In other embodiments, the regions of interest defined include outdoor event locations, parks, malls, cars ahead, cars in traffic, airplanes, busses or trains.

The term "individuals of interest" may extended to animals, e.g., a user's pet, in embodiments of the invention. For example, a user can be walking in a park looking for the user's dog, who has a special locating collar, using a portable device enabled with the present invention. As another example, the user might find the pet cat by scanning the display up and down a tree to find the cat on a high branch.

In yet other embodiments, the individuals of interest can be extended to objects of interest. That is, a user can place a tag on a frequently misplaced item to locate it. The user can select an icon to represent the item in the interface.

Privacy is a concern with the invention. An opt-in process like that used in most social media, that is, the interface uses an opt-in system to preserve privacy of the individuals of interest is envisioned. Once the individual has opted to allow others to locate him in the interface, the users will see the individual (if he is of interest) when the individual is present in a cone or region of interest. Embodiments of the invention may have a time out or snooze option so that there will be times that the individual cannot be located, even though generally the individual has assented to participate in the system. Further, a filter can be used to allow only a certain group of users to locate the individual. A user may set his privacy settings such that they only provide their location upon a real-time request and response. They may also wish to not reveal their location when in a sensitive location such as a bathroom. In embodiments of the invention, a user needs permission from an individual of interest to be able to track him or her on the service.

A portable display device presents the user interface, e.g., on a device such as a smartphone or tablet, by receiving information on the location of one or more individuals of interest and by monitoring the location and orientation of the device. Since this user interface requires only a final direction and distance to the target, in embodiments of the invention, a set of vectors may be exchanged and then summed to construct the final user interface.

In embodiments of the invention, the graphical attributes of the displayed individual may change based on any of: distance from user, movement of individual (e.g., is he walking toward the user, away from the user or in a certain direction, and so forth.), speed of movement (e.g., is the individual of interest in car or walking), and/or physical location of the user (e.g., which floor is he/she on).

Further, whether the individual of interest appears in the display at all depends on whether he/she is inside or outside the zone of interest. In preferred embodiments, the zone of interest is a cone of interest which originates at the user and widens with distance from the user. The maximum distance (e.g., range) of the cone of interest can be configured by the user. In other embodiments of the invention, the zone of interest can be limited to a region of interest such as a block, neighborhood or city. When an individual moves outside of a region of interest (for instance, an individual leaves the crowded bar where the user is searching for his friends) the individual is no longer shown.

Cognitive considerations: The graphical user interface and system may choose a means of highlighting a given set of individuals in the scene based on the number of attributes, user cohort, user preferences, scene complexity, and so forth. Although the preferred embodiment does not merely show the individuals of interest as "dots on a map", as an alternative embodiment, the user can switch between the intuitive interface view and a map view. By being able to switch between the intuitive interface and the map interface, more information is available to the user which may be helpful to locate the individual of interest.

Further, in the illustrated beach crowd scene, had there been a hundred individuals of interest detected in a crowd containing thousands of people, the individuals of interest may be displayed as bright red dots or squares. If there are ten individuals of interest, rather than hundreds, perhaps such people will be represented with small icons or more life-like depictions of the given individuals, and so on. The nature of this "multi-resolution" depiction may be specified by the user, or it may be determined automatically by the interface as a set of defaults.

Some users may have difficulty assimilating too much information at once or simply have a cognitive preference for simplicity. In embodiments of the invention, the system learns the preferences of the user, and new situations may be presented in similar manners to the presentations which the user has selected in the past. The system may learn user preferences and/or preferences for cohorts of users through repeated use of this application over time. This multi-resolution preference may also apply to the depiction of individuals of interest. As groups of users operate a tablet or smartphone in similar ways, e.g., pointing the device north into a crowd, the application stores the selected interface styles among the set of possible interface styles, selected by the respective users based on user preferences, number of individuals, complexity considerations and other factors, the application can use the appropriate learned interface for a new user in a new situation.

Figure 9:
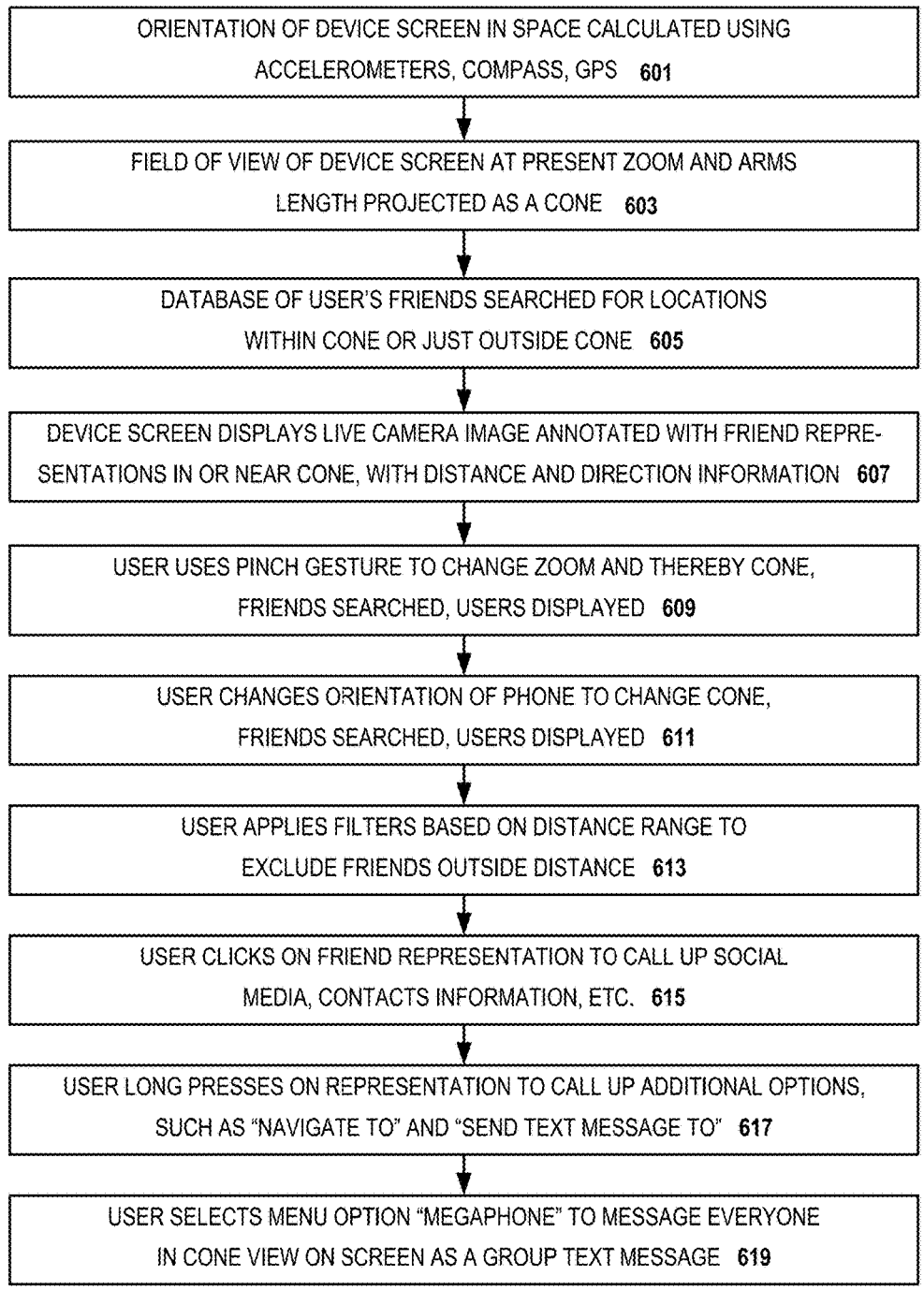
FIG. 9 is a flow diagram illustrating one embodiment of the invention for operating the interface.

FIG. 9 is a flow diagram illustrating one embodiment of the invention for operating the interface. First, the portable device, e.g., a smartphone, determines the position and orientation of the device display in space by using device sensors such as accelerometers, compass and GPS, in step 601. Next, the field of view of the device screen at a present zoom is determined, either from the camera or by calculation from mapping software. The mapping software determines an arm length from the user, projects the landscape features present in a cone from the user and determines how the orienting background should be displayed, step 603. In this embodiment, a live feed from the camera is used for the orienting background in the interface.

Next, in this example, the individuals of interest are the user's friends, so a database of the user's friends is searched for their current locations, i.e. are the individual friends inside the cone of interest, step 605. In embodiments of the invention, individuals just outside within a predetermined distance of the current cone of interest are also displayed in the interface. The predetermined distance can be a factor of the maximum distance or the arc of the cone of interest.

The device screen displays a live camera image as the orienting background and the representation of friends, e.g., avatars, photographs of the friends, who are located in or near the cone of interest. In this embodiment, the representations are annotated with name, distance and direction information, step 607.

The user uses a pinch gesture to change the zoom and thereby the cone of interest which results in a new determination of which friends are located in the new cone of interest, so some of the representations of the friends may disappear or new ones appear depending on the direction of the pinch gesture, i.e. pinch in or pinch out, step 609. In some embodiments, the step will require a new search of the respective locations of the set of friends. In other embodiments, the friend locations are kept in a cache in anticipation of an adjustment of the zone of interest or orientation of the user.

Next, the user changes the orientation of the smartphone. For example, the user first chose a northerly direction and now chooses an easterly direction. This results in a change of the cone of interest, a new search of the friend locations (unless cached) and a new set of representations of friends displayed in the interface, step 611.

In step 613, the user adjusts the filters for the maximum distance range in the cone of interest to exclude friends outside the maximum distance. In preferred embodiments of the invention, this can be accomplished by a vertical pinch in gesture on the background. Other embodiments call up a dialog box so that the user can specify the maximum distance range of the zone of interest.

Next, user clicks on a selected one of the friend representations to call up a social media network, contacts information, and so forth, so that the user can contact the selected friend, or verify that the representation is for the friend that the user wants to contact, step 615. In embodiments of the invention, a "long press" of the representation will bring up additional options. In this illustrative example, the user long presses on the representation of the friend to call up additional options, such as "navigate to" and "send text message to", step 617.

In the drawing, the user selects a menu option called "megaphone" to message everyone in the current cone of interest as a group text message, step 619.

The location of the user and of individuals of interest is determined by phone location, RFID system and by other known location-finding processes in different embodiments of the invention. For example, in embodiments that work with global positioning system (GPS) devices in mobile phones, Wi-Fi-signals, and/or cell phone signals to locate the user and the individuals of interest. In some embodiments, the location technology is selected manually by a user.

Known indoor location tracking methods are used in other embodiments of the invention. An indoor positioning system (IPS) is a system to locate objects or people inside a building using radio waves, magnetic fields, acoustic signals, optical and/or other sensing information. IPS technologies include distance measurement to nearby anchor nodes (nodes with known positions, e.g., Wi-Fi access points), magnetic positioning, dead reckoning. IPS systems either actively locate mobile devices and tags or provide ambient location or environmental context for portable devices.

Bluetooth Low Energy (BLE), Wi-Fi 802.11 on 2.4 GHz and 5 GHz radio communication protocols are used in embodiments of the invention to establish a link between a plurality of devices and infer a network of direction and distance information.

Figure 10:
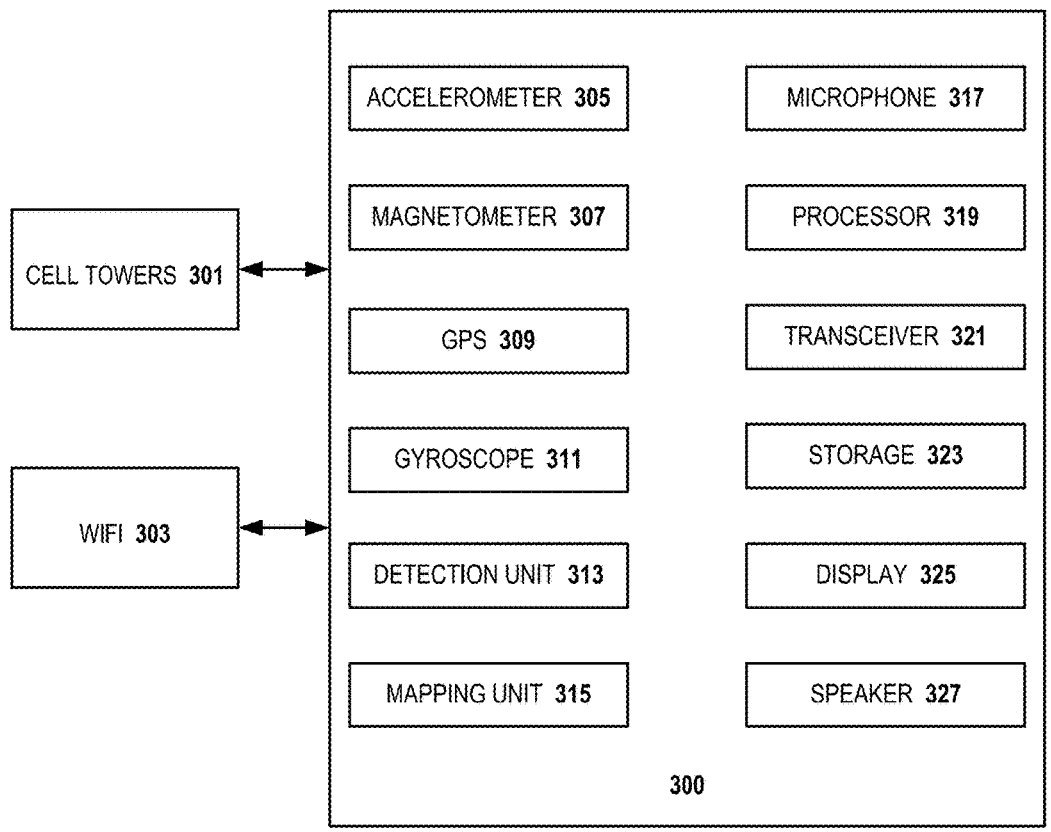
FIG. 10 illustrates an architectural diagram of components for locating a portable device according to an embodiment of the invention.

FIG. 10 illustrates an architectural diagram of components for locating a portable device according to an embodiment of the invention. The portable device 300 is preferably a smartphone, tablet computer, laptop computers and the like. In the diagram, the cell towers 301 and Wi-Fi access point 303 are shown, but one skilled in the art would recognize that other signal providers and acquirers such as Global Positioning System (GPS) satellites would be used in embodiments of the invention. The accelerometer 305 is a sensor that measures acceleration, i.e. movement, tilting motion and orientation of a mobile device. A magnetometer 307 (or compass) is a sensor that detects the Earth's magnetic field to find the orientation of a mobile device. Often the magnetometer and accelerometer are incorporated in the same chip in the device. The Global Positioning System (GPS) 309 is typically a chip in the mobile device that finds the device position using trilateration of at least three satellite signals. In cities with tall skyscrapers GPS is often supplemented with the cell tower and Wi-Fi signals for locating the device. A gyroscope 311 also used to tell how the mobile device is oriented. Detection unit 313 determines the device position and orientation and transmits the position and the orientation to the mapping unit 315. Mobile phones use a motion coprocessor which accepts data from the accelerometer, compass, gyroscope, GPS chip in the phone.

The mapping unit 315 is the component in which the interface of the invention is resident. The mapping unit collects the locations of the user, the cone of interest and the individuals of interest. Given the orientation of the portable device, user preferences, the current filters and the above information, the mapping unit software determines how the user interface should be presented to the user. In the case of an individual of interest, the mapping unit would not necessarily need to present the interface, however, in preferred embodiments, it is envisioned that all users would be equipped with a similar application. This would obviously not be true in the pet or object embodiments discussed above.

The mobile device 300 also includes components related to typical input, output and processing activities. The microphone 317 allows the user to input natural language commands includes a command to the interface such as "find friends" which would start the inventive interface. The processor 319 is used to execute the application in which the invention is embodied as well as other applications running on the mobile device. The transceiver 321 is a combined transmitter and receiver which is used to communicate with one or more networks. Storage 323 is used to store the application and other needed elements such as the friend database. The display 325 is equipped with a touch interface to accept input such as the pinch in and pinch out gestures. The speaker 327 is used to present auditory cues indicating that the desired friends have been found, e.g., the user has oriented the device in the correct direction.

GPS location, while useful, will only allow the location information to be determined usefully over relatively coarse distances. For smaller venues, e.g., an athletic event, concert, or city street, more transient signaling between devices and landmarks can help construct finer resolution maps of where people are in a venue relative to the user of the invention. In this way, relative positional information may be exchanged between devices to estimate distances and direction information for each individual at the venue. This information can then be intuitively displayed using the invention without the need for precise map coordinates for each individual.

Figure 11:
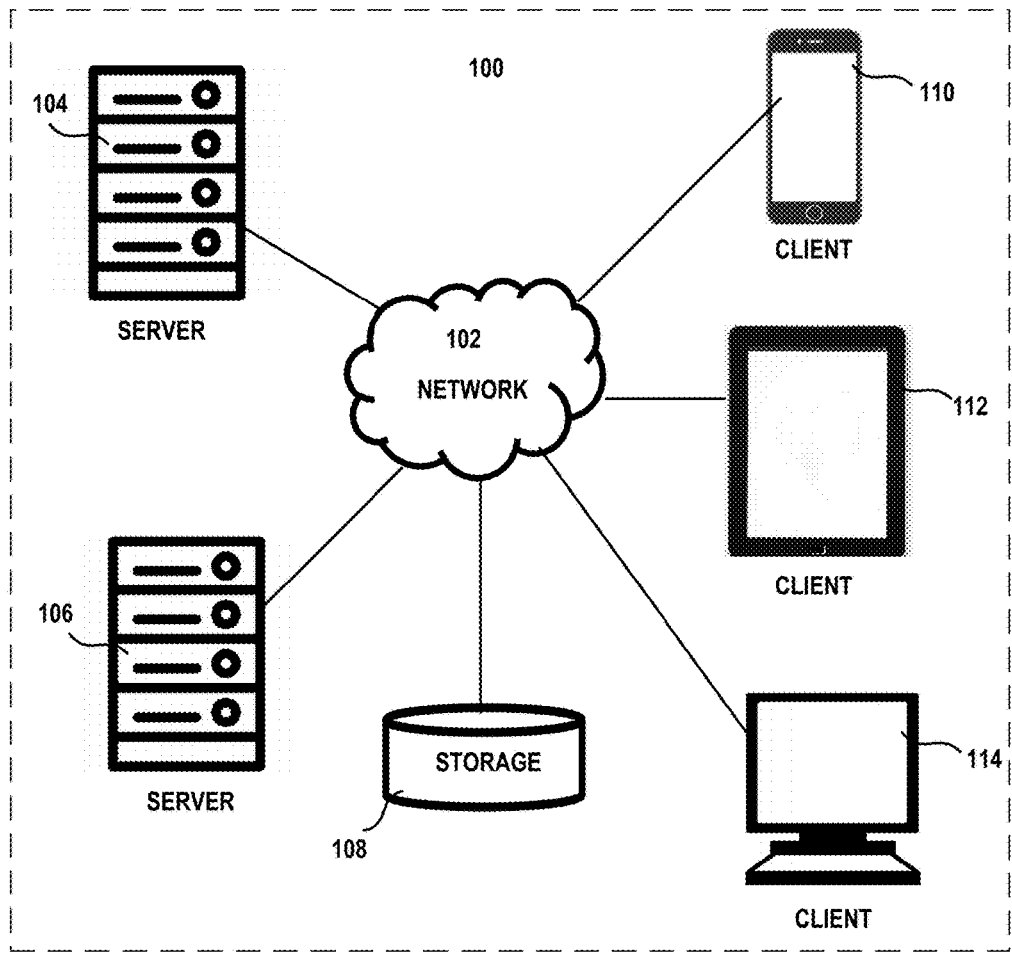
FIG. 11 depicts an exemplary block diagram of a distributed data processing environment in which exemplary aspects of the illustrative embodiments may be implemented.
Figure 12:
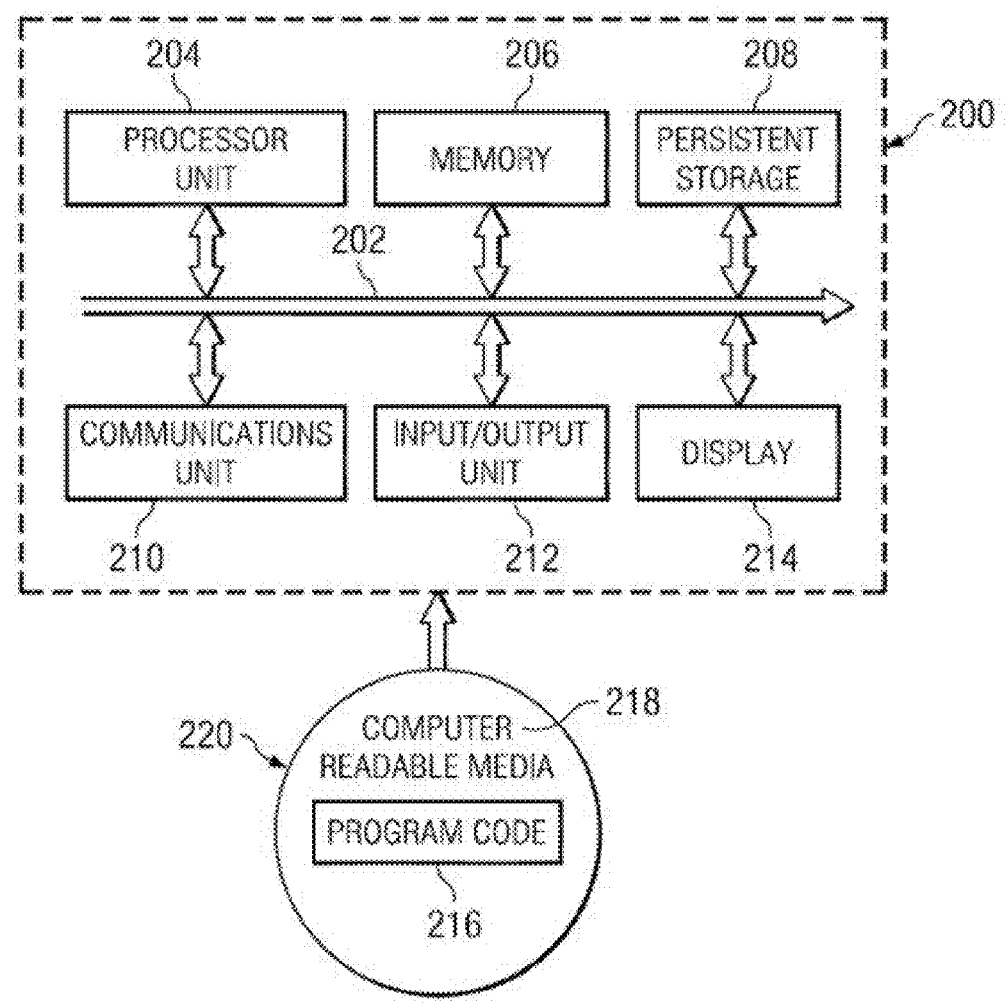
FIG. 12 is an exemplary block diagram of a data processing system in which exemplary aspects of the illustrative embodiments may be implemented.

With reference now to the drawings and in particular with reference to FIGS. 11-12, exemplary diagrams of data processing environments are provided in which illustrative embodiments of the disclosure may be implemented. It should be appreciated that FIGS. 11-12 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 11 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 11 is intended as an example, not as an architectural limitation for different embodiments of the disclosed subject matter, and therefore, the particular elements shown in FIG. 11 should not be considered limiting with regard to the environments in which the illustrative embodiments of the present invention may be implemented.

With reference now to FIG. 12, a block diagram of an exemplary data processing system is shown in which aspects of the illustrative embodiments may be implemented. Data processing system 200 is an example of a computer, such as client 114 in FIG. 11, in which computer usable code or instructions implementing the processes for illustrative embodiments of the disclosure may be located.

With reference now to FIG. 12, a block diagram of a data processing system is shown in which illustrative embodiments may be implemented. Data processing system 200 is an example of a computer, such as server 104 or client 110 in FIG. 11, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 11-12 may vary depending on the implementation. Other internal hardware or peripheral devices, such as flash memory, equivalent non-volatile memory, or optical disk drives and the like, may be used in addition to or in place of the hardware depicted in FIGS. 11-12. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 11 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 12 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The present invention has many advantages over the prior art. Embodiments of the invention have an advantage over "dots on a map" interfaces, as they do not require error compensation to precisely plot a location of the individual of interest. Since the user interface is intuitive and does not require precise location information, the "locating function" is performed cognitively by the user. That is, by showing a user an approximate vector heading and distance, and intuitively orienting the user with a "look through" interface, the user has the needed information to locate the individual of interest.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

We claim:

1. A method for presenting locations of individuals on a display of a portable device comprising:
    determining a region of interest by a location and an orientation of the portable device, wherein the region of interest is a cone of interest radiating away from the location of the portable device in a direction of orientation of the portable device;
    determining a set of locations of one or more individuals of interest with respect to the cone of interest;
    presenting an orienting background and a first set of representations against the orienting background on the display according to the location and orientation of the portable device, each representation of a respective individual of interest located in the cone of interest, the orienting background containing a positional cue of a landmark which the portable device is oriented toward;
    adjusting the cone of interest with a pinch gesture on the orienting background;
    determining a set of locations of one or more individuals of interest with respect to the adjusted cone of interest; and
    presenting a second set of representations against the orienting background.

2. The method as recited in claim 1, wherein the pinch gesture is a pinch in gesture and the pinch in gesture reduces the size of the cone of interest and the second set of representations has fewer members than the first set of representations, wherein the presenting of the orienting background does not change in response to the pinch gesture.

3. The method as recited in claim 1, wherein the pinch gesture is a pinch out gesture and the pinch out gesture increases the size of the cone of interest and the second set of representations has a greater number of members than the first set of representations.

4. The method as recited in claim 1, wherein the pinch gesture is a pinch in gesture and a vertical component of the pinch in gesture decreases a maximum distance of the cone of interest and a horizontal component of the pinch in gesture decreases an arc of the cone of interest.

5. The method as recited in claim 1, wherein the pinch gesture is a pinch out gesture and a vertical component of the pinch out gesture increases a maximum distance of the cone of interest and a horizontal component of the pinch out gesture increases an arc of the cone of interest.

6. The method as recited in claim 1, further comprising presenting a window detailing a number of degrees in an arc and a maximum distance of a current cone of interest.

7. The method as recited in claim 1, wherein a live camera image is presented as the orienting background.

8. Apparatus, comprising:
    a processor;
    computer memory holding computer program instructions executed by the processor for presenting locations of individuals on display of a portable device, the computer program instructions comprising:
        program code, operative to determine a region of interest by a location and an orientation of the portable device, wherein the region of interest is a cone of interest radiating away from the location of the portable device in a direction of orientation of the portable device;
        program code, operative to determine a set of locations of one or more individuals of interest with respect to the cone of interest;
        program code, operative to present an orienting background and a first set of representations against the orienting background on the display according to the location and orientation of the portable device, each representation of a respective individual of interest located in the cone of interest, the orienting background containing a positional cue of a landmark which the portable device is oriented toward;

program code, operative to adjust the cone of interest with a pinch gesture on the orienting background;

program code, operative to determine a set of locations of one or more individuals of interest with respect to the adjusted cone of interest; and program code, operative to present a second set of representations against the orienting background.

9. The apparatus as recited in claim 8, wherein the pinch gesture is a pinch in gesture, a vertical component of the pinch in gesture decreases a maximum distance of the cone of interest, a horizontal component of the pinch in gesture decreases an arc of the cone of interest and the second set of representations has fewer members than the first set of representations, wherein the presenting of the orienting background does not change in response to the pinch gesture.

10. The apparatus as recited in claim 8, wherein the pinch gesture is a pinch out gesture, a vertical component of the pinch out gesture increases a maximum distance of the cone of interest and a horizontal component of the pinch out gesture increases an arc of the cone of interest.

11. The apparatus as recited in claim 8, further comprising program code, operative to present a window detailing a number of degrees in an arc and a maximum distance of a current cone of interest.

12. The apparatus as recited in claim 8, further comprising program code, operative to present a temporary landmark in the orienting background.

13. The apparatus as recited in claim 8, wherein the pinch gesture is a pinch out gesture and the pinch out gesture increases the size of the cone of interest and the second set of representations has a greater number of members than the first set of representations.

14. The apparatus as recited in claim 8, wherein the pinch gesture is a pinch in gesture and a vertical component of the pinch in gesture decreases a maximum distance of the cone of interest and a horizontal component of the pinch in gesture decreases an arc of the cone of interest.

15. A computer program product in a non-transitory computer readable medium for use in a data processing system, the computer program product holding computer program instructions executed by the data processing system for presenting locations of individuals on a display of a portable device, the computer program instructions comprising:

program code, operative to determine a region of interest by a location and an orientation of the portable device, wherein the region of interest is a cone of interest radiating away from the location of the portable device in a direction of orientation of the portable device;

program code, operative to determine a set of locations of one or more individuals of interest with respect to the cone of interest;

program code, operative to present an orienting background and a first set of representations against the orienting background on the display according to the location and orientation of the portable device, each representation of a respective individual of interest located in the cone of interest, the orienting background containing a positional cue of a landmark which the portable device is oriented toward;

program code, operative to adjust the cone of interest with a pinch gesture on the orienting background;

program code, operative to determine a set of locations of one or more individuals of interest with respect to the adjusted cone of interest; and program code, operative to present a second set of representations against the orienting background.

16. The computer program product as recited in claim 15, wherein the pinch gesture is a pinch in gesture, a vertical component of the pinch in gesture decreases a maximum distance of the cone of interest, a horizontal component of the pinch in gesture decreases an arc of the cone of interest and the second set of representations has fewer members than the first set of representations, wherein the presenting of the orienting background does not change in response to the pinch gesture.

17. The computer program product as recited in claim 15, wherein the pinch gesture is a pinch out gesture, a vertical component of the pinch out gesture increases a maximum distance of the cone of interest and a horizontal component of the pinch out gesture increases an arc of the cone of interest.

18. The computer program product as recited in claim 15, further comprising program code, operative to present a window detailing a number of degrees in an arc and a maximum distance of a current cone of interest.

19. The computer program product as recited in claim 15, wherein the pinch gesture is a pinch in gesture and the pinch in gesture reduces the size of the cone of interest and the second set of representations has fewer members than the first set of representations, wherein the presenting of the orienting background does not change in response to the pinch gesture.

20. The computer program product as recited in claim 15, wherein the pinch gesture is a pinch out gesture and the pinch out gesture increases the size of the cone of interest and the second set of representations has a greater number of members than the first set of representations.

* * * * *